(12) United States Patent
Saieva et al.

(10) Patent No.: US 12,346,453 B2
(45) Date of Patent: Jul. 1, 2025

(54) AUTOMATED TESTING OF OPERATING SYSTEM (OS) KERNEL HELPER FUNCTIONS ACCESSIBLE THROUGH EXTENDED BPF (EBPF) FILTERS

(71) Applicant: International Business Machines Corporation, Armonk, NY (US)

(72) Inventors: Anthony Saieva, New York, NY (US); Frederico Araujo, Mahopac, NY (US); Sanjeev Das, White Plains, NY (US); Michael Vu Le, Danbury, CT (US); Jiyong Jang, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 17/952,189

(22) Filed: Sep. 23, 2022

(65) Prior Publication Data

US 2024/0104221 A1   Mar. 28, 2024

(51) Int. Cl.
  *G06F 21/57*   (2013.01)

(52) U.S. Cl.
  CPC ...... *G06F 21/577* (2013.01); *G06F 2221/034* (2013.01)

(58) Field of Classification Search
  None
  See application file for complete search history.

(56) References Cited

U.S. PATENT DOCUMENTS

| | | | |
|---|---|---|---|
| 10,380,350 B1 * | 8/2019 | Ben Porath | G06F 11/3684 |
| 11,709,720 B1 * | 7/2023 | Fournier | G06F 9/545 |
| | | | 719/318 |

(Continued)

FOREIGN PATENT DOCUMENTS

| | | |
|---|---|---|
| CN | 112817597 A | 5/2021 |
| CN | 119907970 A | 4/2025 |
| WO | 2024/061493 A1 | 3/2024 |

OTHER PUBLICATIONS

Sharma, et al., "Enhanced Userspace and In-Kernel Trace Filtering for Production Systems," Journal of Computer Science and Technology 31.6 (2016): 1161-1178.

Naas, et al., "EZIOTracer: Unifying Kernel and User Space I/O Tracing for Data-Intensive Applications," Proceedings of the Workshop on Challenges and Opportunities of Efficient and Performant Storage Systems, 2021, 12 pages.

(Continued)

*Primary Examiner* — Philip J Chea
*Assistant Examiner* — James Ross Hollister
(74) *Attorney, Agent, or Firm* — Michael O'Keefe

(57) ABSTRACT

A method to test an OS kernel interface, such as an eBPF helper function. The interface has a grammar that defines the kernel interface. Testing is carried out using eBPF code that invokes and tests the interface using a fuzzing engine. To facilitate the process, additional user space code is configured to generate at least one kernel event that triggers the eBPF code to run, and to transform inputs from the fuzzing engine according to the grammar that defines the kernel interface. After loading the eBPF code into the OS kernel, the user space code issues the kernel event that causes the eBPF code to run. In response, and as the fuzzing engine executes, the eBPF code records arguments sent to the OS kernel through the kernel interface. The arguments are passed through a data structure shared by the eBPF code and the user space code. By recording the arguments and other diagnostic information, the security of the kernel interface is evaluated.

20 Claims, 6 Drawing Sheets

(56) References Cited

U.S. PATENT DOCUMENTS

| | | | | |
|---|---|---|---|---|
| 2020/0226082 A1* | 7/2020 | Kilmer | ............... | G06F 9/44589 |
| 2021/0026669 A1* | 1/2021 | Freche | ............... | G06F 11/3644 |
| 2022/0147408 A1* | 5/2022 | Asgar | ................ | G06F 11/3636 |
| 2023/0221975 A1* | 7/2023 | Sommers | ........... | G06F 9/44526 |
| | | | | 718/1 |

OTHER PUBLICATIONS

Wang, et al., "SYZVEGAS: Beating Kernel Fuzzing Odds with Reinforcement Learning," Proceedings of the 30th USENIX Security Symposium, Aug. 11, 2021.

Nelson, et al., Specification and verification in the field: Applying formal methods to BPF just-in-time compilers in the Linux kernel, Proceedings of the 14th USENIX Symposium on Operating Systems Design and Implementation, Nov. 4, 2020.

Gawlik, et al., "SoK: Make JIT-Spray Great Again," WOOT @ USENIX Security Symposium 2018.

Nilson, "Fuzzing the Berkeley Packet Filter," Masters Thesis, University of California, Davis ProQuest Dissertations Publishing, 2020. 28000762, Jun. 2020.

syzkaller—kernel fuzzer, https://github.com/google/syzkaller, accessed Sep. 2022.

iovisor/ bpf-fuzzer, https://github.com/iovisor/bpf-fuzzer, accessed Sep. 2022.

eBPF Documentation, https://ebpf.io/what-is-ebpf, accessed Sep. 2022.

"Patent Cooperation Treaty PCT International Search Report", Applicant's File Reference: P202105556, International Application No. PCT/EP2023/067114, International Filing Date: Jun. 23, 2023, Date of Mailing: Oct. 13, 2023, 12 pages.

Vieira et al., "Fast Packet Processing with eBPF and XDP: Concepts, Code, Challenges, and Applications", ACM Computing Surveys, vol. 53, Issue: 1, Article No. 16, Dec. 2019, 38 Pages.

* cited by examiner

AUTOMATED TESTING OF OPERATING SYSTEM (OS) KERNEL HELPER FUNCTIONS ACCESSIBLE THROUGH EXTENDED BPF (EBPF) FILTERS

STATEMENT OF GOVERNMENT RIGHTS

This invention was made with Government support under Contract No.: W912CG-19-C-0003 awarded by the Defense Advanced Research Projects Agency (DARPA). The Government has certain rights in this invention.

BACKGROUND OF THE INVENTION

Technical Field

This disclosure relates generally to extending an operating system (OS) kernel in a computing environment.

Background of the Related Art

Berkeley Packet Filter (BPF) technology is a kernel level functionality that allows userspace code to modify behavior of an operating system kernel while still running in user space. BPF does this through a verified DSL (Domain Specific Language) that ensures that BPF code cannot cause problems with the kernel, which is treated as a trusted codebase. BPF communicates with the kernel through well-defined specially-crafted interfaces.

The Linux OS kernel provides an extended version of the BPF filtering mechanism, called extended BPF (eBPF). Typically, an eBPF program comprises bytecode instructions provided by toolchain technologies, such as LLVM, which compile C (or other) code into BPF. When the kernel receives an eBPF program from user space, it invokes a verifier to analyze whether the program is safe. While the verifier checks eBPF code activity, it does not provide any protection once control flow has passed to the kernel. If the verifier indicates that the code is safe, the kernel invokes a Just-In-Time (JIT) compiler and attaches the resulting instructions to various hook points in the kernel; if, however, the program is not safe, the kernel rejects it.

The rise in the popularity of eBPF (as opposed to classical BPF) has created new interfaces between eBPF programs and the kernel. While the BPF paradigm ensures security through very strict guidelines, eBPF's expanded kernel interfaces include new helper functions, as well the ability to access specially exported kernel functions directly. Because eBPF has new access to the kernel internals, there needs to be a way to test these aspects of the kernel while at the same time still obeying the domain specific constraints imposed by the eBPF runtime environment. These constraints include, for example, the following: an inability to call kernel code directly, an action that would otherwise bypass the eBPF verifier, thereby changing the threat vector entirely; and an inability to know the state of the kernel when an eBPF program is executed, thereby what pieces of the kernel code are exercised (this is because the eBPF filters are asynchronous in nature, as they only run after a kernel event has taken place).

Known prior art techniques do not address this need. Kernel fuzzing is one such technique. Fuzz testing or fuzzing is an automated software testing method that injects invalid, malformed, or unexpected (e.g., semi-random) inputs into a system to reveal software defects and vulnerabilities. A fuzzing tool injects these inputs into the system and then monitors for exceptions, such as crashes or information leakage. Kernel fuzzing, however, does not obey the constraints imposed by the eBPF verifier. Other BPF verifier/JIT compiler security techniques are also insufficient as they do not check the kernel code and instead check the verifier. BPF fuzzing itself has been proposed in the academic literature, but that proposal does not guarantee generating valid BPF programs, and the technique proposed would exhibit performance reductions in practice.

There remains a need in the art to provide automated testing of interfaces between the eBPF program and the kernel that are being developed and implemented.

BRIEF SUMMARY

According to a first aspect of this disclosure, a method is provided for testing an operating system (OS) kernel interface. The kernel interface has a grammar that defines the kernel interface. The method begins by receiving extended Berkeley Packet Filter (eBPF) code that has been configured to invoke and test the OS kernel interface using a fuzzing engine. User space code is also received. The user space code is configured to generate at least one kernel event that triggers the eBPF code to run, and to transform inputs from the fuzzing engine according to the grammar that defines the kernel interface. After loading the eBPF code into the OS kernel, at least one kernel event is generated. In response to generating the at least one kernel event, and as the fuzzing engine executes, arguments sent to the OS kernel through the kernel interface are recorded. The arguments are passed through a data structure shared by the eBPF code and the user space code.

Preferably, the OS kernel interface is an eBPF helper function, and the data structure is an in-memory map. Further, preferably a process identifier of the user space code is associated with the eBPF code so that only arguments caused by the user space code are recorded by the eBPF code.

According to a second aspect of this disclosure, an apparatus configured as an intermediary device is described. The apparatus comprises a processor, and computer memory. The computer memory holds computer program instructions executed by the processor to test an operating system (OS) kernel interface. The kernel interface has a grammar that defines the kernel interface. The computer program instructions comprise program code configured to perform operations such as the steps described above.

According to a third aspect of this disclosure, a computer program product in a non-transitory computer readable medium is provided. The computer program product holds computer program instructions executed by a processor in a host processing system configured to test an operating system (OS) kernel interface. The kernel interface has a grammar that defines the kernel interface. The computer program instructions comprise program code configured to perform operations such as the steps described above.

The subject matter herein enables the construction of valid eBPF programs that utilize the specific kernel interface under test so that verifier inspections are passed. Fuzzing of the eBPF kernel interface is facilitated by including additional user space code that knows how to transform inputs from the fuzzing engine according to the grammar that defines the engine. This enables grammar-based fuzzing decisions to be made. Further, the preferred use of the in-memory map (the data structure shared by the eBPF code and the user space code) ensures that the testing only reacts to events caused by the user space code. Another general advantage is that the approach enables testing of the kernel while still obeying domain specific constraints imposed by the eBPF runtime environment.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
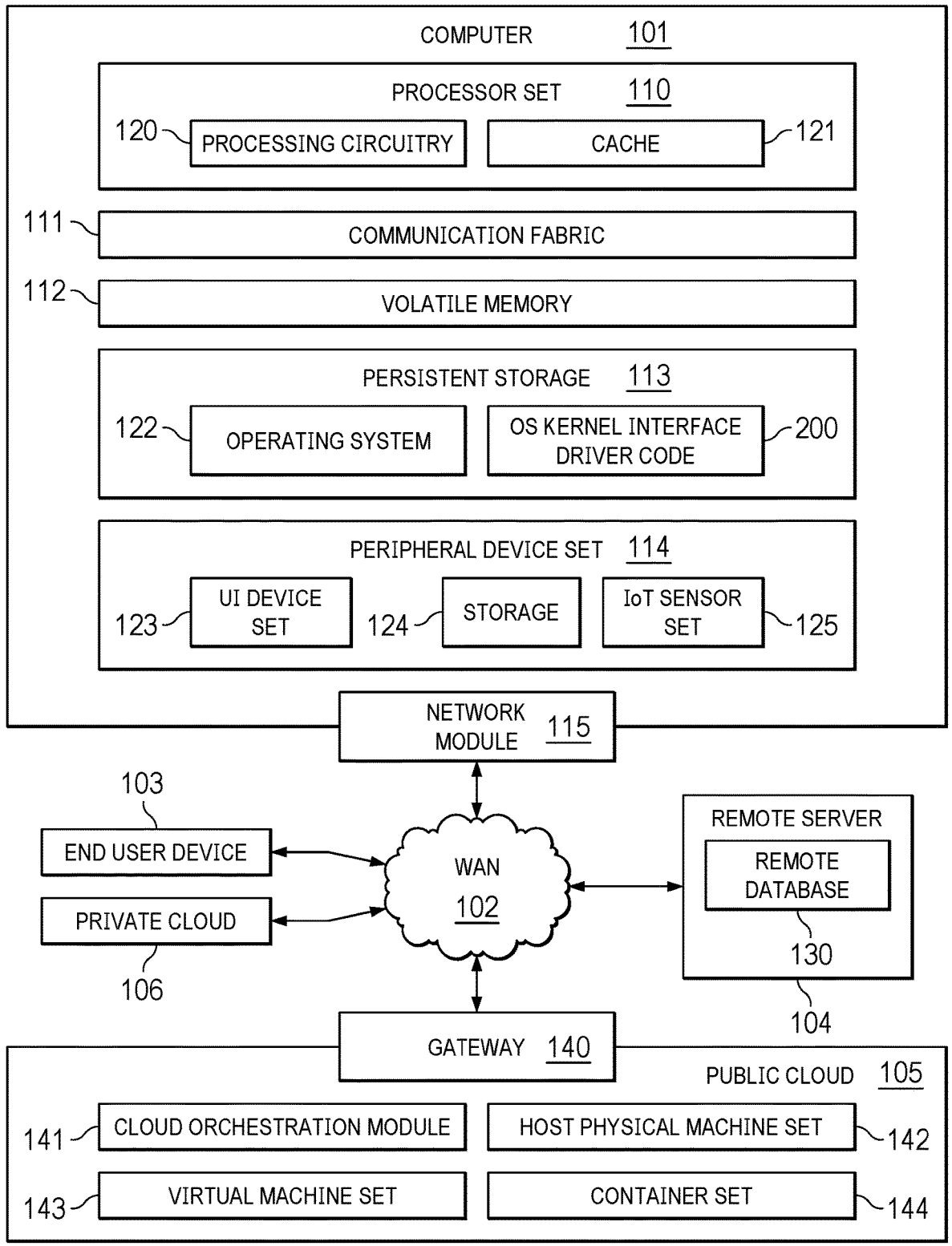
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as OS kernel interface driver code 200 that facilitates automated testing of one or more kernel interfaces. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101.

Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
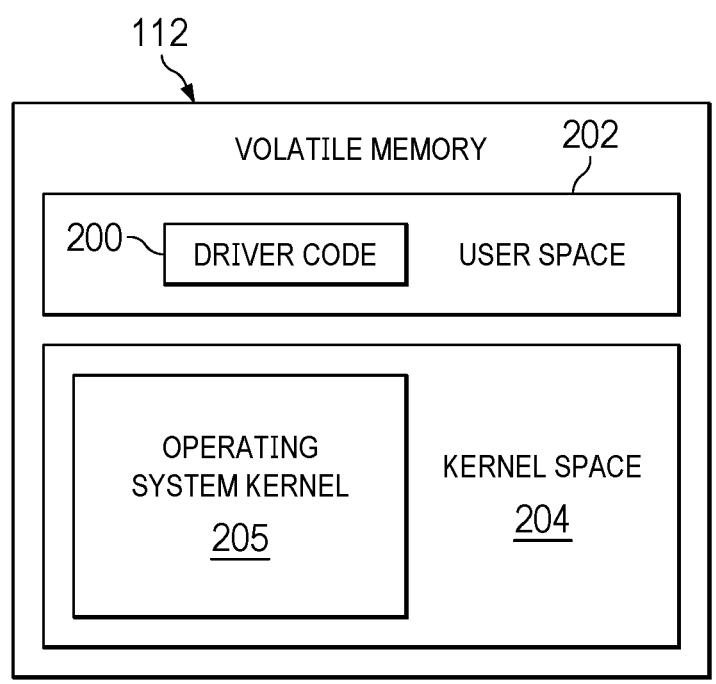
FIG. 2 is an exemplary block diagram of the volatile memory of the data processing system in FIG. 1.

FIG. 2 depicts further details of the Volatile Memory of the computer system such as shown in FIG. 1 after various programs are loaded from the Persistent Storage. As depicted, the Volatile Memory typically comprises a user space 202, and an OS space 204. As will be described, the user space 202 supports the OS kernel interface driver code 200 that facilitates the automated testing methods described below. The OS space 204 supports the OS kernel 205, e.g., Linux, and various kernel support functions and services as will now be described.

eBPF Technology

Figure 3:
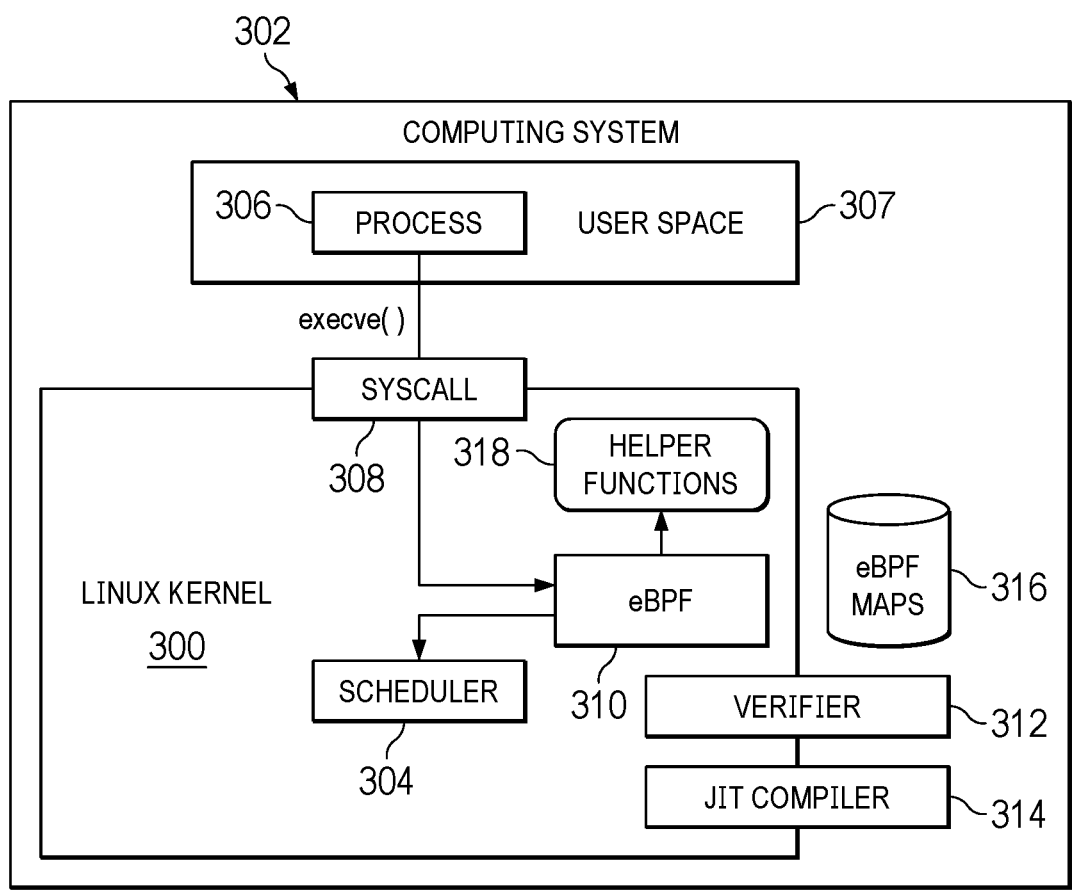
FIG. 3 illustrates a computing system running the Linux operating system kernel and having support for eBPF technology.

By way of further background, and as described above, the extended Berkeley Packet Filter (eBPF) technology provides a mechanism that enables sandboxed programs to be run in an operating system kernel. eBPF, which originated in the Linux kernel, enables kernel capabilities to be safely and efficiently extended without changing the kernel code or loading kernel modules. eBPF programs are event-driven and are run when the kernel or an application passes a defined hook point, such as a system call, function entry or exit, a kernel tracepoint, a network, and others. FIG. 3 depicts this basic event-driven operation. As depicted, the Linux kernel 300 is executing in a computing system 302, such as the computing system depicted in FIG. 2 and described above. The kernel 300 has a scheduler component 304. In this example, which is not intended to be limiting, the hook point is a system call. When a process 306 running in user space 307 executes the system call (Syscall) 308, the eBPF program 310 is loaded into the kernel. Before being attached to the requested hook point, however, the eBPF program 310 has to first pass through a verifier 312 and, if verified, a Just-In-Time compiler 314. Verifier 312 and JIT compiler 314 are kernel services. The verifier 312 ensures that the eBPF program is safe to run, e.g., that the process 306 loading the program has the required privileges, that the eBPF program when executed will not crash, that the eBPF program when executed will run to completion instead of looping, and so forth. If the eBPF program passes the verification, the JIT compiler 314 translates the eBPF program into machine-specific instructions (for the underlying processor hardware) to ensure that the program runs as efficiently as other kernel or kernel module code. In particular, in the usual case the eBPF program (or "filter") is bytecode. Such bytecode can be written directly, but typically the program is developed in C code (or the like) and then compiled into the eBPF bytecode by a compiler tool, such as LLVM. As noted above, the JIT compiler converts the bytecode to the machine-specific instructions. As also shown in FIG. 3, the eBPF program 310 has the ability to share collected information and to store state, using a data structure referred to as an eBPF map 316. The map 316 stores data in one or more map types, such as hash tables, arrays, ring buffers, stack traces, and the like. The eBPF map 316 is accessible from the eBPF program, as well as from applications (such as process 306) executing in the user space 307.

As also depicted, and as will be described further below in the context of the subject disclosure, the eBPF program 310 makes function calls into one or more helper functions 318, which are provided as a kernel application programming interface (API). These helper functions are required because eBPF programs are not permitted to call into arbitrary kernel functions. The set of helper functions 318 is varied, and new helper functions are being constantly added to the kernel API by developers. As such, there is a need in the art to provide ways to test eBPF kernel interfaces. The technique of this disclosure, which is now described, addresses this need.

Testing eBPF Kernel Interfaces

According to this disclosure, and with respect to a specific kernel interface (e.g., helper function) of interest, a valid eBPF program—namely, one that will later pass the kernel verifier's inspections, is constructed. In addition, and to facilitate fuzzing, the strict definitions defined by the kernel interface (the helper function) are examined and used to define a grammar (or signature) for that interface. These definitions typically include, argument types passed to the interface, interface (symbol) name, return type of the interface, how the set of argument types map to the return values, and the like. These definitions facilitate creation of driver code that is intended to run in user space. The driver code is specialized code that is designed to cause one or more specific kernel events that will trigger the eBPF program that is loaded into the kernel. The driver code also includes a grammar-based plug-in, which is designed to call into an in-process fuzzing engine (e.g., LibFuzzer) that is later be used to test the interface. As will be described, this grammar-based (or "structure-aware") plug-in enables grammar-based ("structurally-aware") fuzzing.

Figure 4:
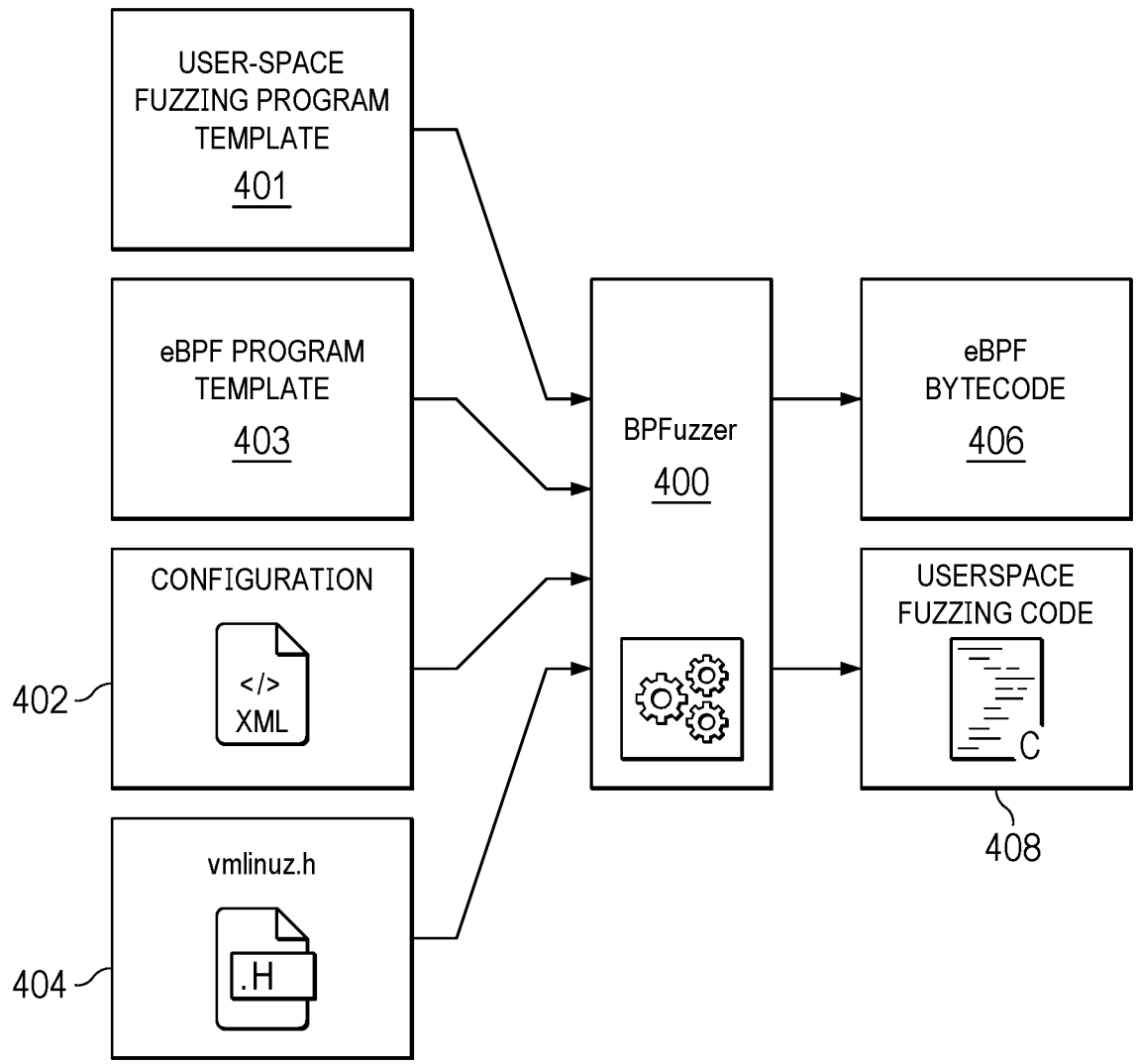
FIG. 4 depicts a technique implemented during a development phase for generating valid eBPF code and an associated user space code set that implements the fuzzing technique of this disclosure.

FIG. 4 depicts the construction of the eBPF program and the driver code. Typically, these elements are constructed in a development. In this example embodiment, the code pieces are built by a technology such as LLVM 400. LLVM 400 is a set of compiler and toolchain technologies that can be used to develop a front end for any programming language and a back end for any instruction set architecture. LLVM is designed around a language-independent intermediate representation (IR) that serves as a portable, high-level assembly language that can be optimized with a variety of transformations over multiple passes. As shown, LLVM 400 receives several input(s): a user-space fuzzing program template 401, a configuration file 402 an eBPF program template 403, and a header file 404. The configuration file 402 contains the identification of the target helper function (the kernel efface at issue), the helper function arguments to fuzz, the helper properties to fuzz, eBPF program type, and event hook. This information may be provided as an XML file. In addition, LLVM 400 receives type information of each argument and the structs in the target interface (namely, the data structures the interface needs to deal with). A struct is a way to group several related variables, and each variable in the structure is known as a member of the structure. Unlike an array, a structure can contain many different data types (int, float, char, etc.). Typically, this information is specified with by an include to the vmlinuz.h header file 404. The file 404 is generated code that contains all the type definitions that the Linux kernel uses in its own source code. After one or more passes with the identified inputs, the LLVM 400 outputs the eBPF bytecode 406 that a calling process will attach to and from which calls to the helper function will be made, and the user space fuzzing code 408 that loads the eBPF program, has the driver code, and that contains the grammar-based plug-in that contains the one or more hooks to the fuzzing engine. This completes the development phase.

As will be described, although the fuzzing code 408 drives the fuzzing procedure by generating specific kernel events that trigger the eBPF program 406 that executes in the kernel during the runtime operation, as is now described. The user space code is the driver for the fuzzing procedure. In particular, because eBPF filters cannot contain certain loops, they need to rely on the user space driver to derive new fuzzing inputs and generate the events that will trigger the eBPF filter to call on the eBPF helper with those inputs (a fuzzing iteration).

Figure 5:
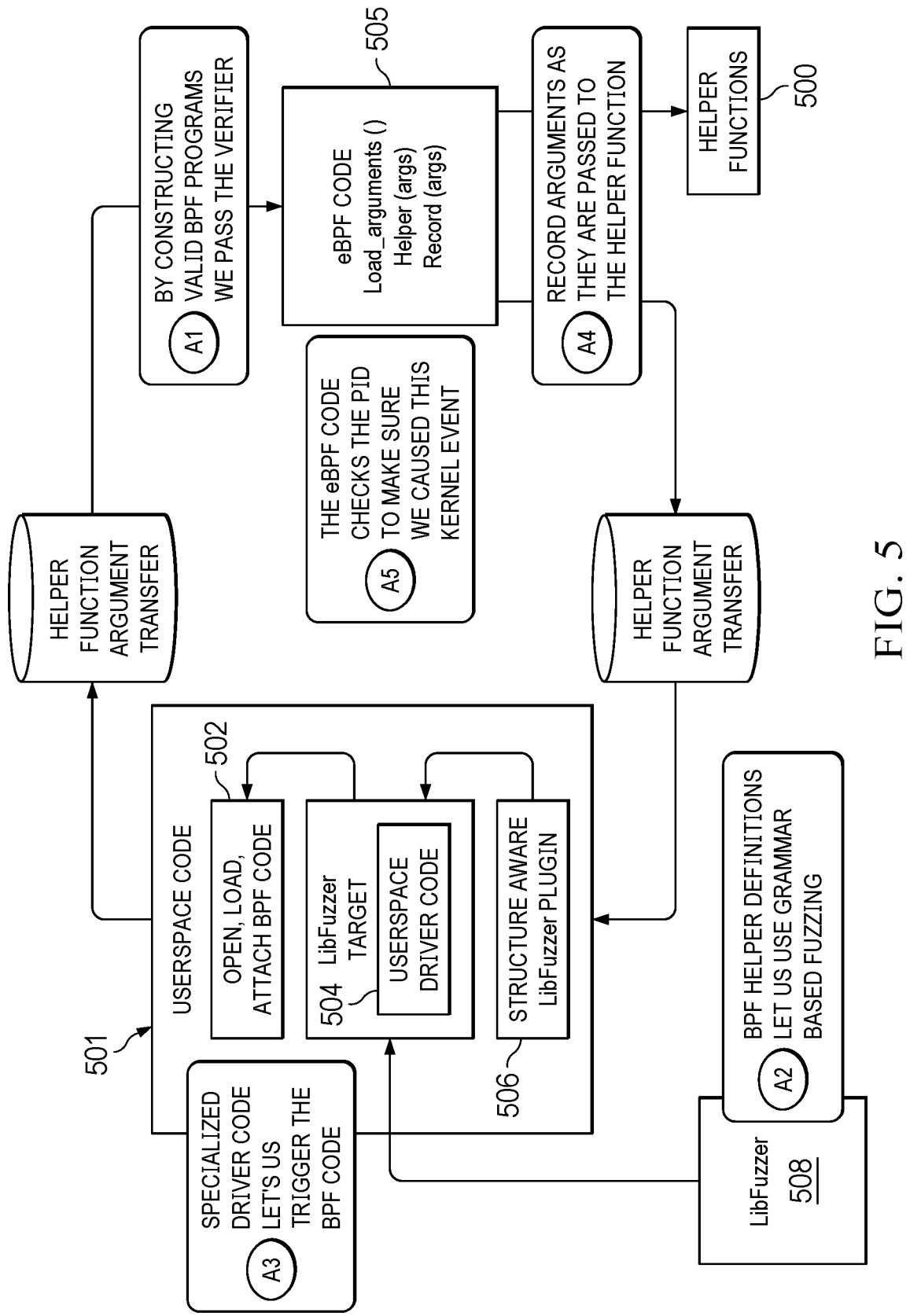
FIG. 5 depicts a runtime operation with respect to the eBPF and user space code elements to fuzz an OS helper function.

FIG. 5 depicts a runtime operation with respect to the above-described code elements that have been developed for the helper function 500 (the kernel interface) at issue. In this figure, only one helper function 500 is depicted, but the techniques herein may be practiced against many such helper functions and in an automated manner. As shown, here the user space code 501 comprises the fuzzing harness that drives the fuzzing procedure and supplies the kernel space eBPF code 505 with random-structured inputs to test the helper functions 500 at each fuzzing iteration. In particular, the fuzzing code includes a first component 502 that opens, loads and (if the code is verified) attaches the eBPF code 505 to a hook point. This process was described generally with respect to FIG. 3. The user space code 501 also includes a second component 504, which is the driver code that, among other things, generates one or more specific kernel events of interest that will trigger the eBPF program (after it has been loaded and verified). In addition, the driver code interfaces with the third component 506, the structure-aware plug-in to the fuzzing engine 508 (in this example, LibFuzzer). The components 502, 504 and 506 are shown as distinct, but this is not a requirement. The eBPF code 505 (once loaded, verified and attached to the hook point) runs in kernel space, as previously described. As depicted, and as has been described, the eBPF code 505 is code that has been constructed to be a valid eBPF (operation A1) so as to be able to pass verification by the kernel verifier (not shown). Operation A2 depicts how the helper function definitions (the grammar) enable user grammar-based fuzzing. Operation A3 depicts how the specialized driver code (here, component 502) enables triggering of the eBPF code. The additional operation A4 depicts diagnostic functions that are enabled by the approach. In particular, operation A4 depicts the eBPF code recording arguments as they are passed to the helper function. Diagnostics may also examine stack traces or other code behavior data. Operation A5 depicts the eBPF code checking a Process IDentifier (PID) of the driver code to confirm that the driver code caused the specific kernel event that calls the eBPF. In this regard, and according to the approach herein, preferably the PID of the driver code functions as a key in the eBPF filter to ensure that the system only reacts to events and activity caused by the driver code. The user space code also passes the PID of the fuzzing process to the kernel.

According to a further aspect, operations A4 and A5 such as depicted in FIG. 5 leverage data structures that are shared by the user space code 501 and the eBPF code 505. These data structures are sometimes referred to herein as a memory map. The eBPF map as depicted in FIG. 3 may be utilized for this purpose.

Figure 6:
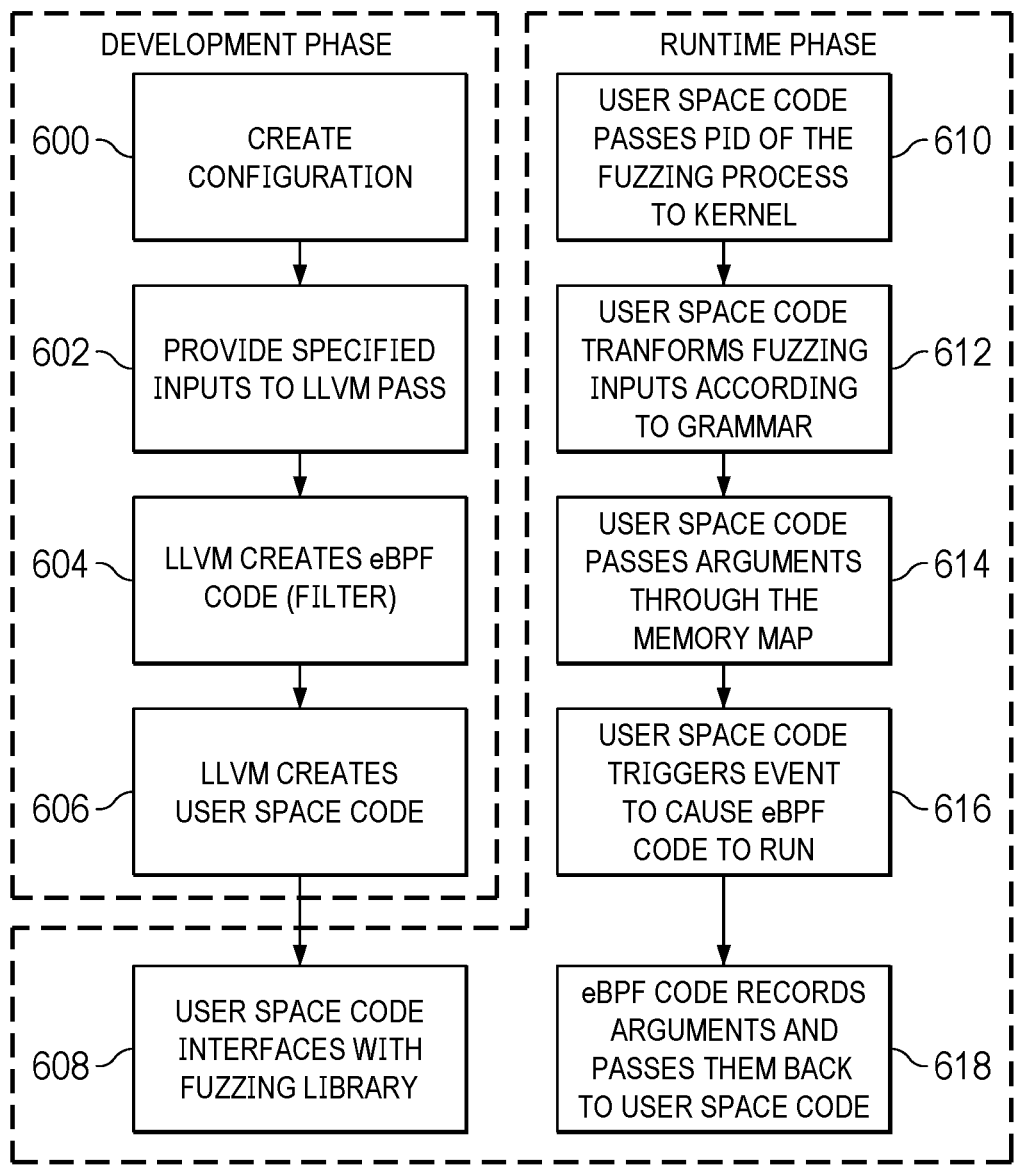
FIG. 6 depicts an end-to-end (development and runtime) process flow for automated evaluation of an eBPF kernel helper function according to this disclosure.

FIG. 6 depicts an end-to-end process flow describing the development and runtime phases. At step 600, a configuration is created. As has been described, the configuration specifies the kernel interface under test including, without limitation, the argument types passed to the interface, the interface (symbol) names, and the return type of the interface. At step 602, the kernel interface configuration is passed, along with the user-space fuzzing program template, the eBPF program template, and the header file specifying the kernel data structures, to an LLVM generation pass. At step 604, the LLVM generation pass creates a valid eBPF filter that will call the specified kernel interface with the appropriate eBPF program type. At step 606, the LLVM generation pass also creates user space code that, upon execution, opens, loads, and attaches the eBPF filter. At step 608, the user space code interfaces with a fuzzing library to handle input generation. As noted, eBPF code is event-driven, and step 608 generates the one or more events. At step 610, the user space code passes a Process ID (PID) of the fuzzing process to the kernel. At step 612, the user space code transforms the inputs from the fuzzing library to the appropriate types according to the grammar that defines the kernel interface. At step 614, the user space code passes those arguments to the eBPF code through shared data structures (a memory map, such as the eBPF map previously described). At step 616, the user space code triggers a kernel event that causes the eBPF code to run. At step 618, the eBPF code—having been verified, JIT-compiled and hooked, records any arguments that were sent to the kernel through the interface and passes them back to user space code through the shared data structures. This completes the processing.

Thus, and according to this disclosure, valid eBPF programs that utilize a specific kernel interface under test are constructed so that the program passes the verifier's inspections. To this end, the strict definitions defined by the interface are examined and are used as a grammar that informs the fuzzing decisions. After the eBPF filter is loaded, specialized driver code is used to cause the specific kernel events that trigger the eBPF filter loaded into the kernel. As the kernel executes, arguments to the kernel interface are recorded as they are passed in so that, even if the kernel crashes, the inputs that caused the crash can be recovered. In operation, and as noted above, preferably the Process ID (PID) of the driver code functions as a key in the eBPF filter to ensure that the system only reacts to events caused by the driver code for the particular kernel interface.

The technique provides significant advantages. The approach enables the construction of valid eBPF programs that utilize the specific kernel interface under test so that verifier inspections are passed. Fuzzing of the eBPF kernel interface is facilitated by including additional user space code that knows how to transform inputs from the fuzzing engine according to the grammar that defines the engine. This enables grammar-based fuzzing decisions to be made, even though coverage-based fuzzing is not available for use. Further, the use of the in-memory map (the data structure shared by the eBPF code and the user space code) ensures that the testing only reacts to events caused by the user space code. Another general advantage is that the approach enables testing of the kernel while still obeying domain specific constraints imposed by the eBPF runtime environment.

Generalizing, the method according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment. The eBPF and user space code generation and/or the kernel interface testing may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the eBPF and user space code generation and kernel interface testing are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As already mentioned, the techniques disclosed herein are not limited to any particular processing environment, but this will be a typical implementation. As noted, the above-described function may be used in any system, device, portal, site, or the like wherein request query syntax may be changed, modified, updated or otherwise altered.

The techniques herein provide for improvements to another technology or technical field, namely, automated testing systems, as well as improvements to the operational capabilities of such systems when used in the manner described.

Having described the subject matter, what is claimed is as follows.

The invention claimed is:

1. A method of testing an operating system (OS) kernel interface, the kernel interface having a grammar that defines the kernel interface, comprising:
   receiving extended Berkeley Packet Filter (eBPF) code that has been configured to invoke and test the OS kernel interface using a fuzzing engine, wherein the OS kernel interface comprises driver code;
   receiving user space code that has been configured to generate at least one kernel event that triggers the eBPF code to run, and to transform inputs from the fuzzing engine according to the grammar that defines the kernel interface;
   after loading the eBPF code into the OS kernel, generating the at least one kernel event, wherein the driver code causes only spacific kernel events to trigger the eBPF based on a process ID of the driver code; and
   responsive to generating the at least one kernel event, and as the fuzzing engine executes, recording arguments sent to the OS kernel through the kernel interface, wherein the arguments are passed through a data structure shared by the eBPF code and the user space code.

2. The method as described in claim 1 wherein the OS kernel interface is a helper function.

3. The method as described in claim 1 further including associating a process identifier of the user space code with the eBPF code so that only arguments caused by the user space code are recorded by the eBPF code.

4. The method as described in claim 1 wherein the data structure is an in-memory map.

5. The method as described in claim 1 further including generating the eBPF code by:
   receiving a configuration file that specifies one or more argument types passed to the kernel interface, one or more interface symbol names, and one or more return types of the kernel interface; and
   processing the configuration file together with a file specifying kernel data structures through one or more passes of a compiler.

6. The method as described in claim 1 wherein the user space code is also configured to open, load and attach the eBPF code.

7. The method as described in claim 1 further including using the recorded arguments to identify the inputs upon a given occurrence.

8. An apparatus configured as an intermediary device, comprising:
   a processor;
   computer memory holding computer program instructions executed by the processor to test an operating system (OS) kernel interface, the kernel interface having a grammar that defines the kernel interface, the computer program instructions comprising program code configured to:
      receive extended Berkeley Packet Filter (eBPF) code that has been configured to invoke and test the OS kernel interface using a fuzzing engine, wherein the OS kernel interface comprises driver code;
      receive user space code that has been configured to generate at least one kernel event that triggers the eBPF code to run, and to transform inputs from the fuzzing engine according to the grammar that defines the kernel interface;
      after loading the eBPF code into the OS kernel, generate the at least one kernel event, wherein the driver code causes only specific kernel events to trigger the eBPF based on a process ID of the driver code; and
      responsive to generating the at least one kernel event, and as the fuzzing engine executes, record arguments sent to the OS kernel through the kernel interface, wherein the arguments are passed through a data structure shared by the eBPF code and the user space code.

9. The apparatus as described in claim 8 wherein the OS kernel interface is a helper function.

10. The apparatus as described in claim 8 wherein the computer program instructions further include program code configured to associate a process identifier of the user space code with the eBPF code so that only arguments caused by the user space code are recorded by the eBPF code.

11. The apparatus as described in claim 8 wherein the data structure is an in-memory map.

12. The apparatus as described in claim 8 wherein the computer program instructions also include program code configured to generate the eBPF code by:
   receiving a configuration file that specifies one or more argument types passed to the kernel interface, one or more interface symbol names, and one or more return types of the kernel interface; and
   processing the configuration file together with a file specifying kernel data structures through one or more passes of a compiler.

13. The apparatus as described in claim 8 wherein the user space code is also configured to open, load and attach the eBPF code.

14. The apparatus as described in claim 8 wherein the computer program instructions also include program code configured to use the recorded arguments to identify the inputs upon a given occurrence.

15. A computer program product in a non-transitory computer readable medium, the computer program product holding computer program instructions executed by a processor in a host processing system configured to test an operating system (OS) kernel interface, the kernel interface having a grammar that defines the kernel interface, the computer program instructions comprising program code configured to:
   receive extended Berkeley Packet Filter (eBPF) code that has been configured to invoke and test the OS kernel interface using a fuzzing engine, wherein the OS kernel interface comprises driver code;
   receive user space code that has been configured to generate at least one kernel event that triggers the eBPF code to run, and to transform inputs from the fuzzing engine according to the grammar that defines the kernel interface;
   after loading the eBPF code into the OS kernel, generate the at least one kernel event, wherein the driver code causes only specific kernel events to trigger the eBPF based on a process ID of the driver code; and
   responsive to generating the at least one kernel event, and as the fuzzing engine executes, record arguments sent to the OS kernel through the kernel interface, wherein the arguments are passed through a data structure shared by the eBPF code and the user space code.

16. The computer program product as described in claim 15 wherein the OS kernel interface is a helper function.

17. The computer program product as described in claim 15 wherein the computer program instructions further include program code configured to associate a process identifier of the user space code with the eBPF code so that only arguments caused by the user space code are recorded by the eBPF code.

18. The computer program product as described in claim 15 wherein the data structure is an in-memory map.

19. The computer program product as described in claim 15 wherein the computer program instructions also include program code configured to generate the eBPF code by:
   receiving a configuration file that specifies one or more argument types passed to the kernel interface, one or more interface symbol names, and one or more return types of the kernel interface; and
   processing the configuration file together with a file specifying kernel data structures through one or more passes of a compiler.

20. The computer program product as described in claim 15 wherein the user space code is also configured to open, load and attach the eBPF code.

* * * * *